United States Patent
Morita (10) Patent No.: US 8,094,820 B2
(45) Date of Patent: Jan. 10, 2012

(54) INFORMATION RECORDING/REPRODUCING DEVICE

(75) Inventor: Shuji Morita, Kyoto (JP)

(73) Assignee: Panasonic Corporation, Osaka (JP)

( * ) Notice: Subject to any disclaimer, the term of this patent is extended or adjusted under 35 U.S.C. 154(b) by 1152 days.

(21) Appl. No.: 11/886,431

(22) PCT Filed: Feb. 27, 2006

(86) PCT No.: PCT/JP2006/303582
§ 371 (c)(1),
(2), (4) Date: Sep. 14, 2007

(87) PCT Pub. No.: WO2006/098136
PCT Pub. Date: Sep. 21, 2006

(65) Prior Publication Data
US 2008/0165966 A1    Jul. 10, 2008

(30) Foreign Application Priority Data
Mar. 14, 2005 (JP) ................................ 2005-070885

(51) Int. Cl.
H04N 7/167 (2011.01)
H04N 7/16 (2011.01)
H04L 9/08 (2006.01)
H04L 9/32 (2006.01)
G06F 11/30 (2006.01)
G06F 7/04 (2006.01)

(52) U.S. Cl. ........ 380/229; 380/200; 380/228; 380/278; 713/171; 713/193; 725/2; 726/2

(58) Field of Classification Search .............. 380/200, 380/202, 228, 229, 278; 713/189, 171, 193; 726/27, 2; 725/2
See application file for complete search history.

(56) References Cited

U.S. PATENT DOCUMENTS

| 7,124,304 B2 * | 10/2006 | Bel et al. .................. 713/193 |
| 7,124,443 B2 * | 10/2006 | Ishibashi et al. ............. 726/26 |
| 7,324,974 B1 * | 1/2008 | Cho et al. ................... 705/51 |
| 7,371,959 B2 * | 5/2008 | Hiratsuka ................. 84/645 |
| 2006/0242074 A1 * | 10/2006 | Kokkinen ................ 705/53 |

FOREIGN PATENT DOCUMENTS

| JP | 2002-091827 | 3/2002 |
| JP | 2002-149172 | 5/2002 |
| JP | 2002-260326 | 9/2002 |
| JP | 2003-132425 | 5/2003 |

* cited by examiner

Primary Examiner — Mohammad Reza
(74) Attorney, Agent, or Firm — McDermott Will & Emery LLP (57) ABSTRACT

[PROBLEM] To provide an information recording/reproducing apparatus, an information recording/reproducing method, an information recording/reproducing program and a record medium, secure contents are reproduced with a mobile device so that a check-out can be made on memory card of a small capacity thereby to prevent an authorized copy of the secure contents.

[SOLVING MEANS] The information recording/reproducing apparatus creates a title key, encrypts the contents in accordance with a title key; stores the encrypted contents, stores navigation information on the reproduction of the contents containing the title key, encrypts the title key in accordance with the medium ID of an external medium, outputs the encrypted title key and an externally connecting method to the external medium, and transmits the encrypted contents stored, to the outside in case a request for the contents is received from the outside.

3 Claims, 7 Drawing Sheets

Information recording/reproducing device
(IP address = #1)

Navigation information
| Content ID | Title key | Checkout destination (medium ID) |
|---|---|---|
| #1001 | Title key 1 | None |
| #1002 | Title key 2 | 0001,0005 |
| #1003 | Title key 3 | 0005 |

Contents
| Content ID | Encrypted contents |
|---|---|
| #1001 | Content 1 |
| #1002 | Content 2 |
| #1003 | Content 3 |

⇩ Check out content (content ID = #1001) to memory card

Navigation information
| Content ID | Title key | Checkout destination (medium ID) |
|---|---|---|
| #1001 | Title key 1 | 0001 |
| #1002 | Title key 2 | 0001,0005 |
| #1003 | Title key 3 | 0005 |

Contents
| Content ID | Encrypted contents |
|---|---|
| #1001 | Content 1 |
| #1002 | Content 2 |
| #1003 | Content 3 |

Memory card (medium ID=0001)

Navigation information
| Content ID | Encrypted title key | IP address |
|---|---|---|
| #1002 | Title key A | #1 |

⇨

Navigation information
| Content ID | Encrypted title key | IP address |
|---|---|---|
| #1002 | Title key A | #1 |
| #1001 | Title key B | #1 |

F I G. 4

| Information recording/reproducing device | Checkout | Memory card (medium ID=0001) |
|---|---|---|
| Title key 2 | → | Encrypted title key A |
| Title key 1 | → | Encrypted title key B |

INFORMATION RECORDING/REPRODUCING DEVICE

RELATED APPLICATIONS

This application is the U.S. National Phase under 35 U.S.C. §371 of International Application No. PCT/JP2006/303582, filed on Feb. 27, 2006, which in turn claims the benefit of Japanese Application No. 2005-070885, filed on Mar. 14, 2005, the disclosures of which Applications are incorporated by reference herein.

TECHNICAL FIELD

The present invention relates to information recording/reproducing apparatus that records secure contents to a built-in recording medium and reproduces it. Particularly, it relates to information recording/reproducing apparatus capable of reproducing the secure contents with a portable device by checking out the secure contents to a memory card that has a function of protecting the copyrights.

BACKGROUND ART

Recently, functions of the portable device have been rapidly expanding, and such functions as seen in portable telephones, e.g. contents display on the Internet, function of sending and receiving mails, picking up and reproducing still pictures and moving pictures, have become established as the standard functions. In addition, for the still pictures and moving pictures, the high-definition pictures have been developed as a factor for differentiation, and high-performance image pickup elements have been developed and commercialized. In accordance with this, size of the data handled by a portable device goes on increasing.

Further, these portable devices not only record the contents of still pictures and moving pictures in an internal memory, but also record them in a detachable memory card. Thereby, transfer of the content to other portable devices or PC (Personal Computers) can be easily achieved, and various kinds of data within the portable device can be carried out of the device.

Furthermore, through using a memory card having a copyright protecting function also with respect to the content protected by the copyright, a method for recording to the memory card by encrypting the content is employed. Since a system has been employed that decrypts the encrypted content by using a medium ID that is the characteristic number of the memory card. Thus, decryption is difficult since it is not possible to duplicate the medium ID even though the encrypted content is duplicated to other memory cards. In this way, duplication of the content is controlled by the use of the memory card that has the copyright protecting function. As described above, "duplicating of the encrypted content to a memory card" is referred to as "checkout".

Patent Literature 1 discloses a terminal device that receives encrypted content data and a license key from a distribution server. In this case, however, a memory card of a large capacity is also required since the encrypted content data is downloaded from the server so as to record it to the memory card.
Patent Literature Japanese Unexamined Patent Publication 2002-91827

DISCLOSURE OF THE INVENTION

Problem to be Solved by the Invention

As just described, the data size of the content handled by the portable device goes on increasing. On the contrary, users can record the vast amount of contents to the memory card by replacing the memory cards used in the past with the ones having large-capacity. However, the large-capacity memory cards are still expensive and hard to be purchased.

Further, depending on the advancement in the information communication network and the like such as the Internet, each user can easily access to information on the network through the portable device such as the portable telephone. In such information communication network, information is transmitted by digital signals. Therefore, even when each individual user duplicates music or video data transmitted through the above-described information communication network, the data can be duplicated almost without deterioration in the sound quality and the picture quality due to the duplication processing. Thus, when a creative work protected under the copyright of the creator who has created music data, image data, etc., is transmitted on such information communication network, the right of the copyright holder may be violated seriously if it is not taken a proper countermeasure for protecting the copyright.

Based on these circumstances, the action itself of distributing the music data and image data to the public through the digital information communication network is restricted under the rights of public transmission of the copyright holder. Thus, it is necessary to take sufficient measures for protecting the copyright. In this case, concerning the content of the creative work such as the music data or the image data to be transmitted to the public through the information communication network, it is necessary to prevent the once-received content from being duplicated further freely.

Means for Solving Problem

The information recording/reproducing apparatus of the present invention is an apparatus with a built-in recording medium for recording and reproducing a content, which comprises: a title key generating part for generating a title key; a content encrypting part for performing encryption processing to the content according to the title key; a content storage part for storing the content that has been encrypted; a navigation information storage part for storing navigation information that is information concerning reproduction of the content including the title key; a title key encrypting part for performing encryption processing to the title key; an interface part for giving and receiving data between an external medium; a transmitting/receiving part for performing communication between outside; and a control part, wherein the control part stores a medium ID that is inputted through the interface part in the navigation information storage part, the control part outputs the title key contained in the navigation information obtained from the navigation information storage part and the medium ID to the title key encrypting part, the title key encrypting part performs encryption processing to the title key according to the medium ID and outputs it, the control part outputs the title key that has been encrypted and a connecting method from outside to the transmitting/receiving part to the external medium through the interface part, and when a request for the content is received from outside through the transmitting/receiving part, the encrypted content stored in the content storage part is transmitted to the outside through the transmitting/receiving part when the medium ID of the navigation information stored in the navigation information storage part accords with a medium ID received from the outside through the transmitting/receiving part.

The information recording/reproducing method of the present invention comprises steps of:
 a step for generating a title key;
 a step for performing encryption processing to a content according to the title key;
 a step for storing the content that has been encrypted;
 a step for storing navigation information that is information concerning reproduction of the content including the title key and a medium ID of an external medium;
 a step for performing encryption processing to the title key according to the medium ID;
 a step for outputting the title key that has been encrypted and a connecting method from outside, to the external medium; and
 a step for transmitting the encrypted content stored in the content storage part to the outside through the transmitting/receiving part when the medium ID of the navigation information accords with a medium ID received from the outside upon receiving a request for the content from outside through the transmitting/receiving part.

The above-described information recording/reproducing method further comprises steps of:
 a step for receiving the encrypted content;
 a step for obtaining a title key by performing decryption processing to the encrypted title key recorded in the external medium using its own medium ID; and
 a step for decrypting and reproducing the received encrypted content by using the title key that has been obtained.

The information recording/reproducing program for going on an information recording/reproducing apparatus which comprises: a title key generating part for generating a title key; a content encrypting part for performing encryption processing to the content according to the title key; a content storage part for storing the content that has been encrypted; a navigation information storage part for storing navigation information that is information concerning reproduction of the content including the title key; a title key encrypting part for performing encryption processing to the title key; an interface part for giving and receiving data between an external medium; a transmitting/receiving part for performing communication between outside; and a control part, wherein
 the control part stores a medium ID that is inputted through the interface part in the navigation information storage part,
 the control part outputs the title key contained in the navigation information obtained from the navigation information storage part and the medium ID to the title key encrypting part,
 the title key encrypting part performs encryption processing to the title key according to the medium ID and outputs it,
 the control part outputs the title key that has been encrypted and a connecting method from outside to the transmitting/receiving part to the external medium through the interface part, and
 the encrypted content stored in the content storage part is transmitted to the outside through the transmitting/receiving part when the medium ID of the navigation information stored in the navigation information storage part accords with a medium ID received from the outside through the transmitting/receiving part upon receiving a request for the content from outside through the transmitting/receiving part.

The recording or transmission medium of the present invention can be read out with a computer that carries the information recording/reproducing program.

According to the information recording/reproducing apparatus, the information recording/reproducing method, and the information recording/reproducing program, it becomes unnecessary to record the secure contents of a large data size in the external medium main body even in the case of checking out the secure contents of the large data size to the external medium, through recording the title key for decrypting the secure content and the access method to the server where the secure content is recorded, in the external medium.

Further, the portable device to which the external medium is inserted accesses to the information recording/reproducing apparatus via a network such as the Internet by reading out the access method to the information recording/reproducing apparatus recorded in the external medium, and requests the secure content to be reproduced. However, the secure contents distributed on the network are encrypted so that, even if a third party duplicates the contents unjustly, the third party cannot decrypt or reproduce it since the title key for decryption is present only within the information recording/reproducing apparatus or the external medium.

Furthermore, the title key recorded within the external medium is encrypted with the medium ID that is peculiar to the external medium. Thus, the medium ID cannot be duplicated even if the data inside the external medium is duplicated. Therefore, it is not possible to obtain the proper title key in the duplicated external medium from the encrypted title key.

Moreover, the secure content is transmitted to the portable device only when the medium ID of the external medium obtained in checking out the secure content from the information recording/reproducing apparatus to the external medium accords with the medium ID of the external medium inserted to the portable device that requests the secure content from outside. Therefore, it is possible to disapprove the request of the secure content from the portable device to which an improper external medium is inserted so as to prevent unnecessary transmission of the secure content.

Effects of the Invention

In information recording/reproducing apparatus of the present invention, it is possible to check out the secure content to a small-capacity memory card for reproducing the secure content with the portable device, and prevent the unfair duplication of the secure content.

DESCRIPTION OF REFERENCE NUMERALS

101 External input part
102 Encoding part

103 Content encrypting part
104 Switch
105, 106 Connecting terminal
107 Control part
108 Title key generating part
109 Content storage part
110 Operation part
111 Navigation information storage part
112 Decoding part
113 External output part
114 Title key encrypting part
115 Interface part
116 Memory card (external medium)
117 Transmitting/receiving part
118 Antenna
201 Information recording/reproducing apparatus
202 Portable device
203 Network

EMBODIMENT FOR CARRYING OUT THE INVENTION

Hereinafter, an embodiment of the present invention will be described referring to the accompanying drawings.

Figure 1:
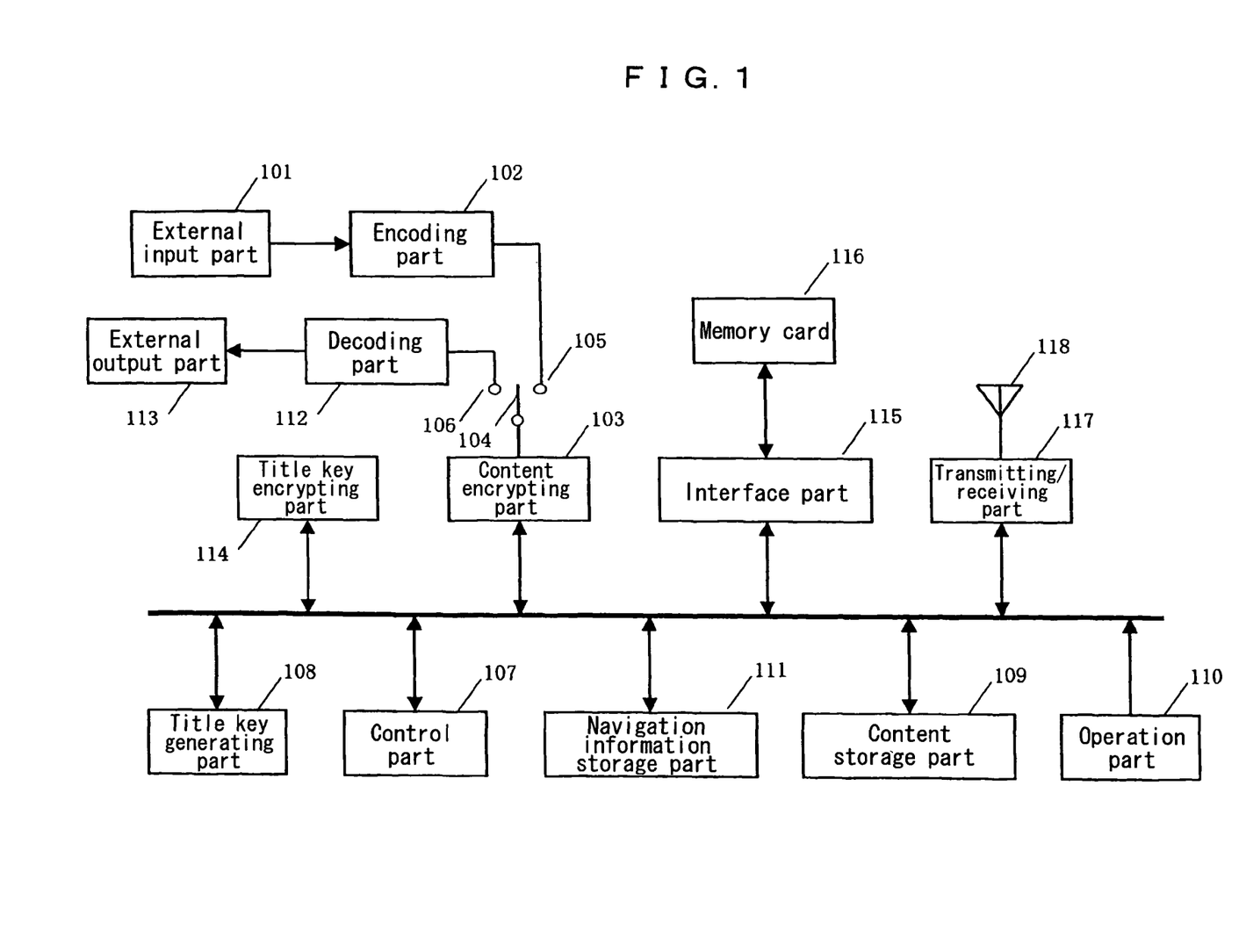
FIG. 1 A block diagram of an information recording/reproducing apparatus according to an embodiment of the present invention.

FIG. 1 is a block diagram showing the structure of an information recording/reproducing apparatus according to the embodiment of the present invention.

As shown in FIG. 1, the information recording/reproducing apparatus is constituted with an external input part 101, an encoding part 102, a content encrypting part 103, a switch 104, a switching terminal 105, a switching terminal 106, a control part 107, a title key generating part 108, a content storage part 109, an operation part 110, a navigation information storage part 111, a decoding part 112, an external output part 113, a title key encrypting part 114, an interface part 115, a memory card 116 as an external medium, a transmitting/receiving part 117, and an antenna 118.

The external input part 101 inputs the content from outside and outputs the content to the encoding part 102.

The encoding part 102 performs encoding processing to the inputted content with a prescribed encoding method.

The switching terminals 105, 106 and the switch 104 constitute a switch changeover circuit. When the switch 104 is connected to the switching terminal 105, the data outputted from the encoding part 102 is inputted to the content encrypting part 103. When the switch 104 is connected to the switching terminal 106, the data outputted from the content encrypting part 103 is inputted to the decoding part 102.

The content encrypting part 103 performs encryption processing with title key to the content that is inputted from the encoding part 102, and outputs the content to the content storage part 109. Alternatively, it performs decoding processing to the encrypted content inputted from the content storage part 109, and outputs the content to the decoding part 112.

The control part 107 controls the entire information recording/reproducing apparatus while performing the data control with the content encrypting part 103, the title key generating part 108, the content storage part 109, the operation part 110, the navigation information storage part 111, the title key encrypting part 114, the interface part 115 and the transmitting/receiving part 117. The data to be controlled are mainly the data such as contents, navigation information, title keys, etc.

The title key generating part 108 generates the title key that is used in performing encryption processing to the content according to an instruction from the control part 107.

The content storage part 109 records the encrypted content to a recording medium.

The operation part 110 outputs the operation detail by detecting the key operation of the user and outputs it to the control part 107.

The navigation information storage part 111 records the navigation information including the information necessary for reproduction, e.g. the content ID that is the characteristic number of the content, the title key used for decrypting the encrypted content, etc.

The decoding part 112 performs decoding processing to the content outputted from the content encrypting part 103 with a prescribed encoding method and outputs the content to the external output part 113.

The external output part 113 outputs the content inputted from the decoding part 112 to the external output device such as a display or a speaker.

The title key encrypting part 114 inputs the title key generated in the title key generating part 108 and the medium ID of the memory card from the control part 107, and performs encryption processing on the title key using the medium ID.

The interface part 115 performs exchange of data between the information recording/reproducing apparatus and the memory card 116.

The memory card 116 is a memory provided with a non-volatile memory that can be inserted to the information recording/reproducing apparatus and a portable device respectively. There is an area in a part of the memory where it is not accessible without going through authentication processing, and the important information concerning the copyright protecting function is stored in this area.

The transmitting/receiving part 117 performs communication with the portable device and the like through the antenna 118.

Figure 2:
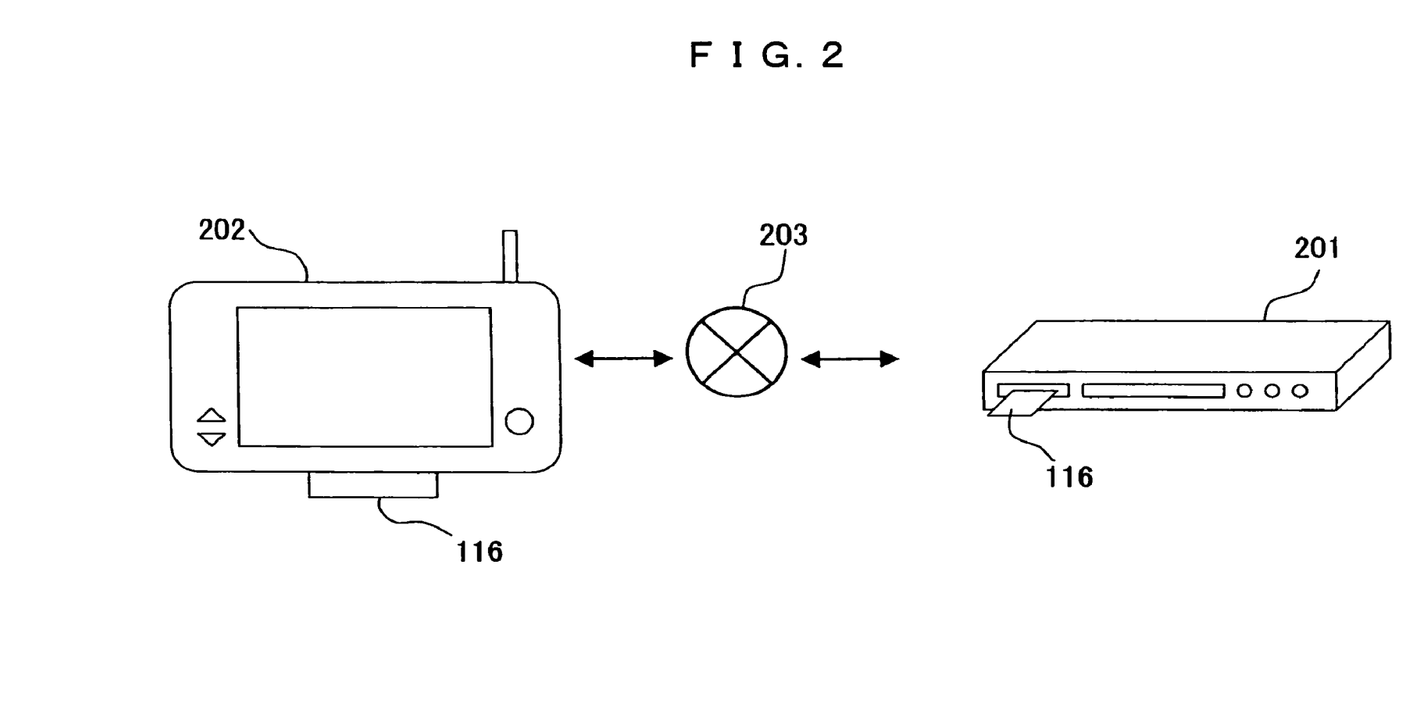
FIG. 2 An illustration showing a system construction of the information recording/reproducing apparatus according to the embodiment of the present invention.

FIG. 2 shows an example of a system constituted with the information recording/reproducing apparatus according to the embodiment of the present invention and the portable device.

The information recording/reproducing apparatus 201 and the portable device 202 exchange the data through the network 203 and the memory card 116. The network 203 is assumed to be the public telephone network, the Internet or the like.

Figure 3:
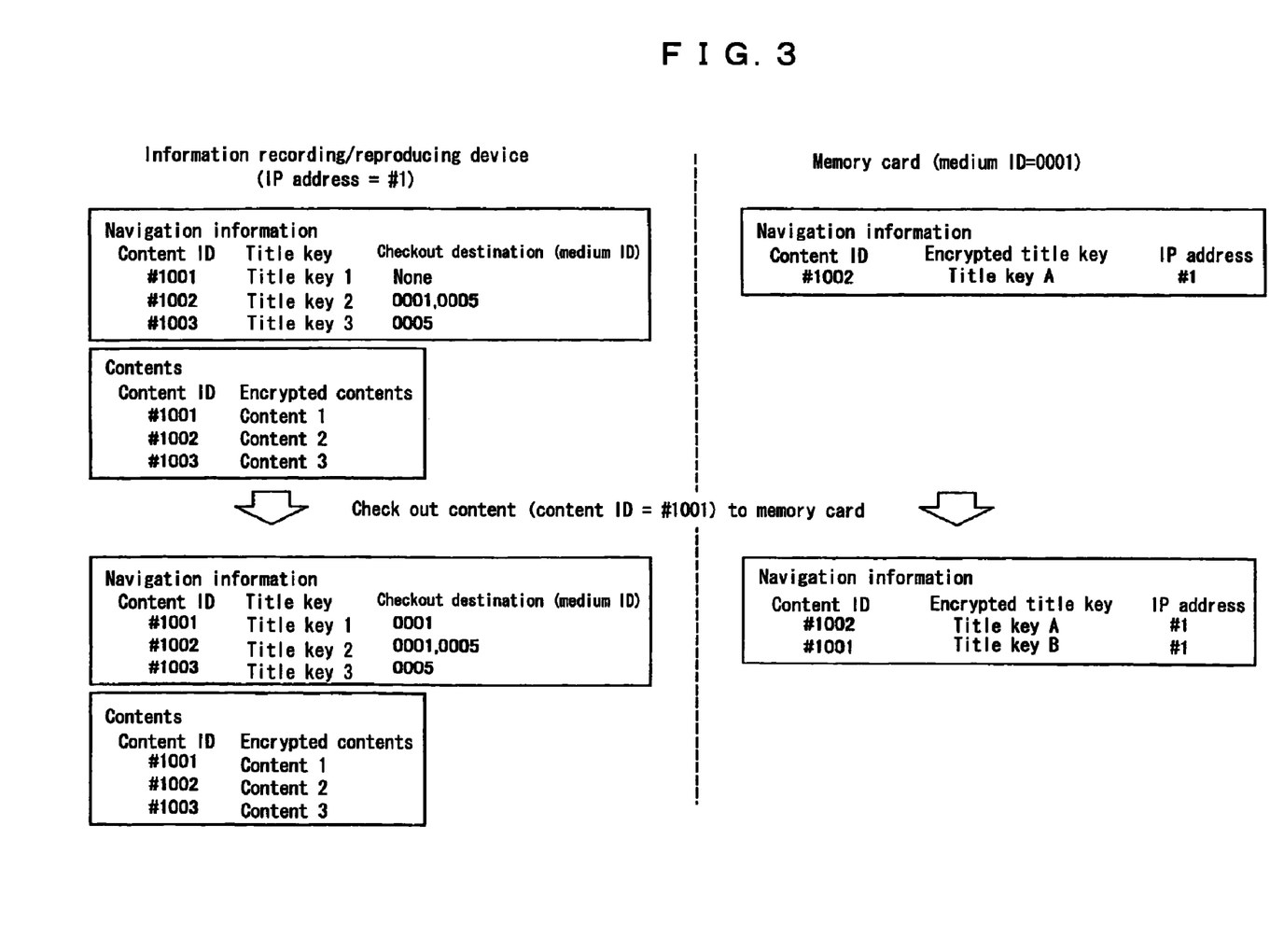
FIG. 3 An illustration showing the structure of navigation information according to the embodiment of the present invention.

FIG. 3 shows a list of the navigation information recorded in the information recording/reproducing apparatus according to the embodiment of the present invention and a list of the navigation information recorded in the memory card.

It shows the state of the navigation information and the content before and after checking out the content of the content ID=#1001.

Figure 4:
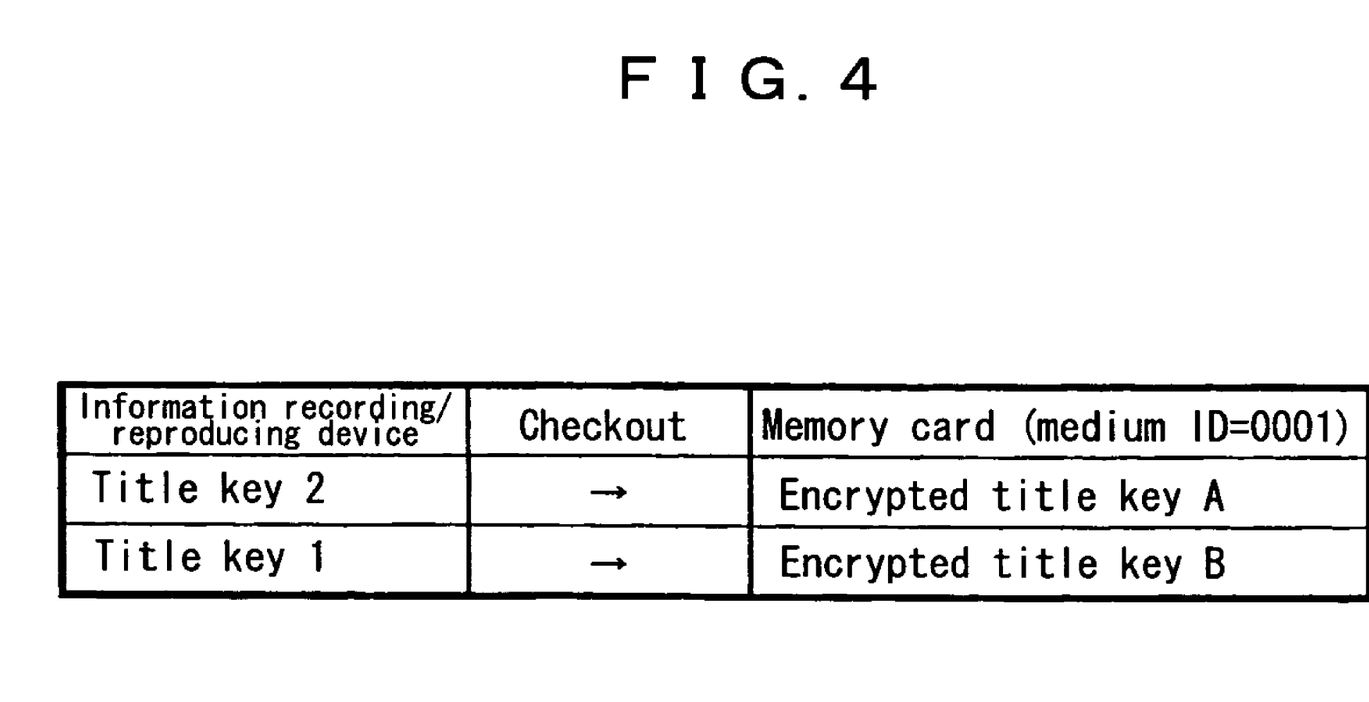
FIG. 4 An illustration for encryption processing of a title key according to the embodiment of the present invention.

FIG. 4 is an illustration showing the correlation diagram between the title keys recorded in the information recording/reproducing apparatus according to the embodiment of the present invention and the encrypted title keys recorded in the memory card.

In writing a title key 1 to the memory card with the medium ID of 0001, an encrypted title key B is generated by encryption processing to be written thereto. In writing a title key 2, an encrypted title key A is generated by encryption processing to be written to the memory card.

Figure 5:
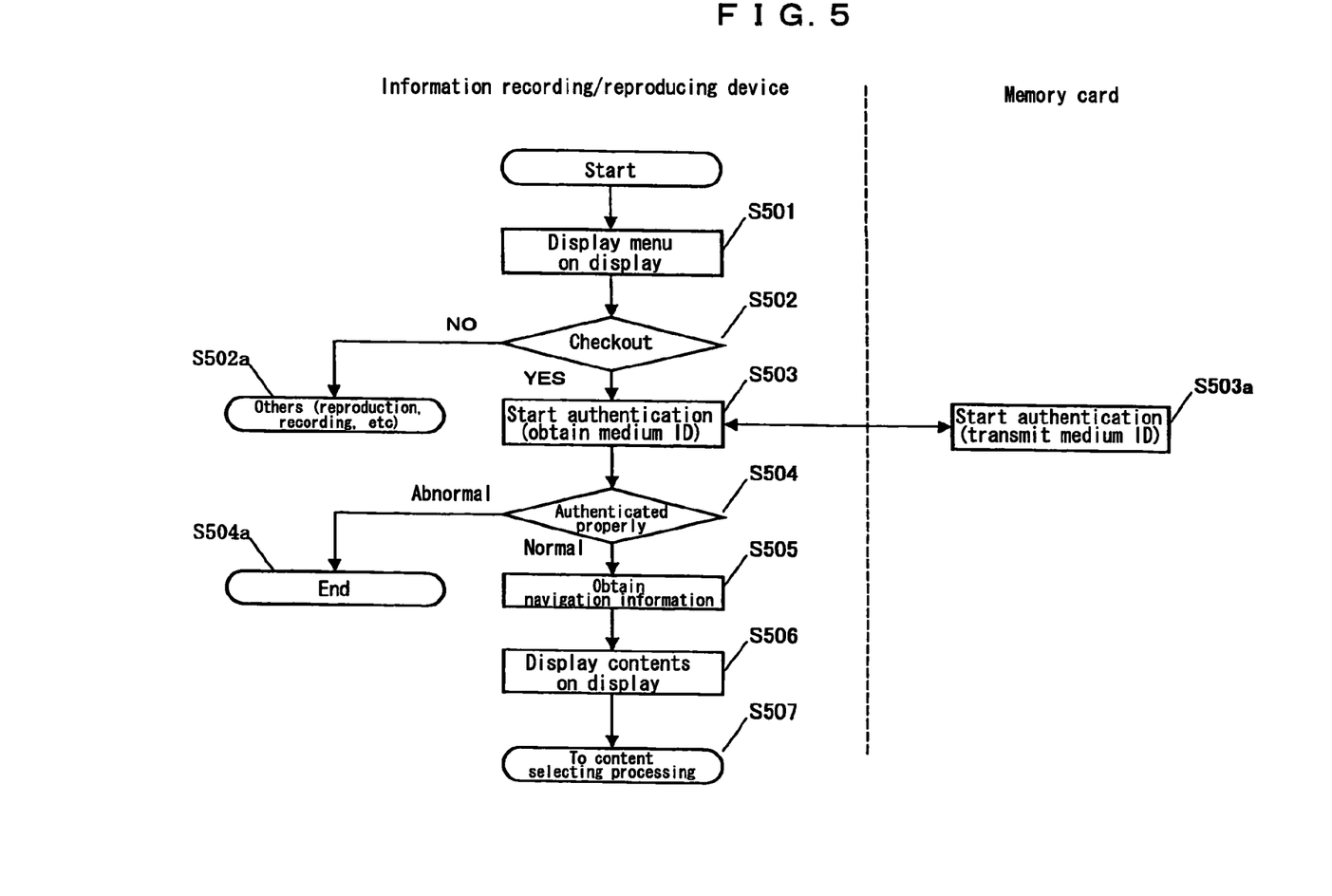
FIG. 5 An operational flowchart of the information recording/reproducing apparatus according to the embodiment of the present invention.
Figure 6:
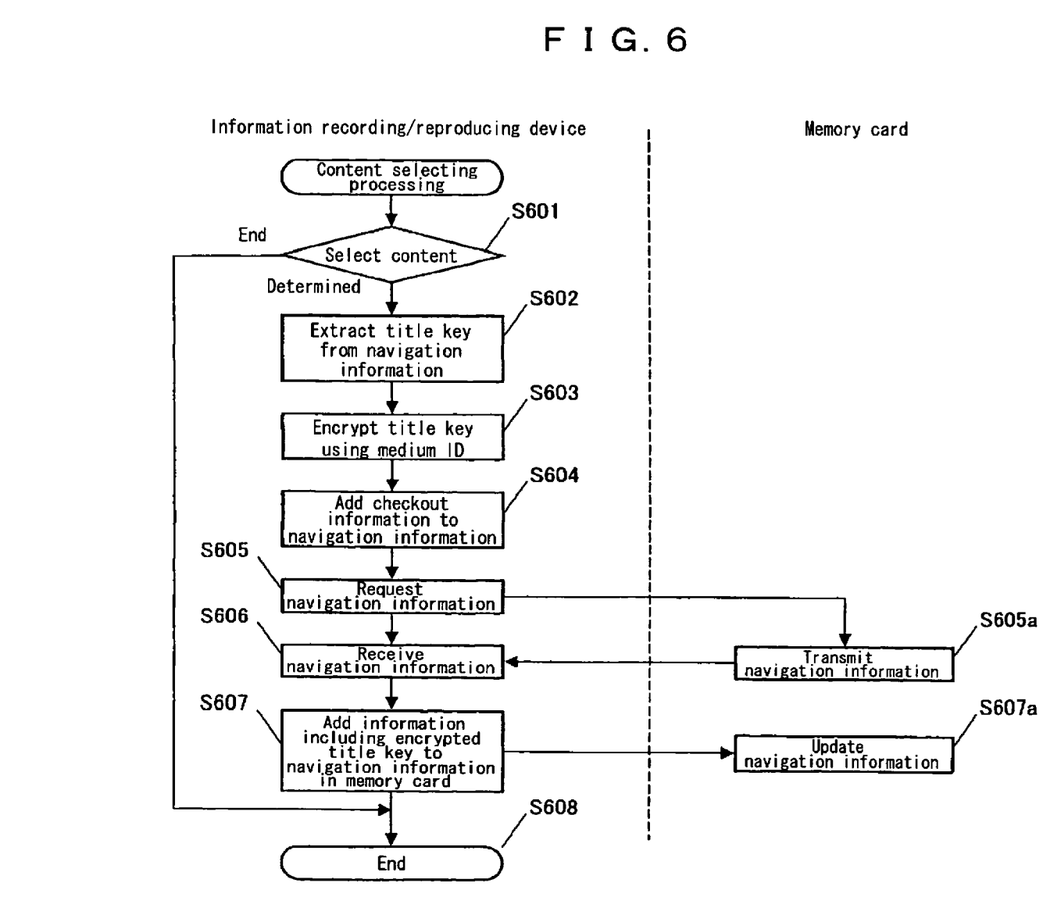
FIG. 6 An operational flowchart of the information recording/reproducing apparatus according to the embodiment of the present invention.

FIG. 5 and FIG. 6 are flowcharts of the operation program when the information recording/reproducing apparatus according to the embodiment of the present invention checks out the content to the memory card.

Figure 7:
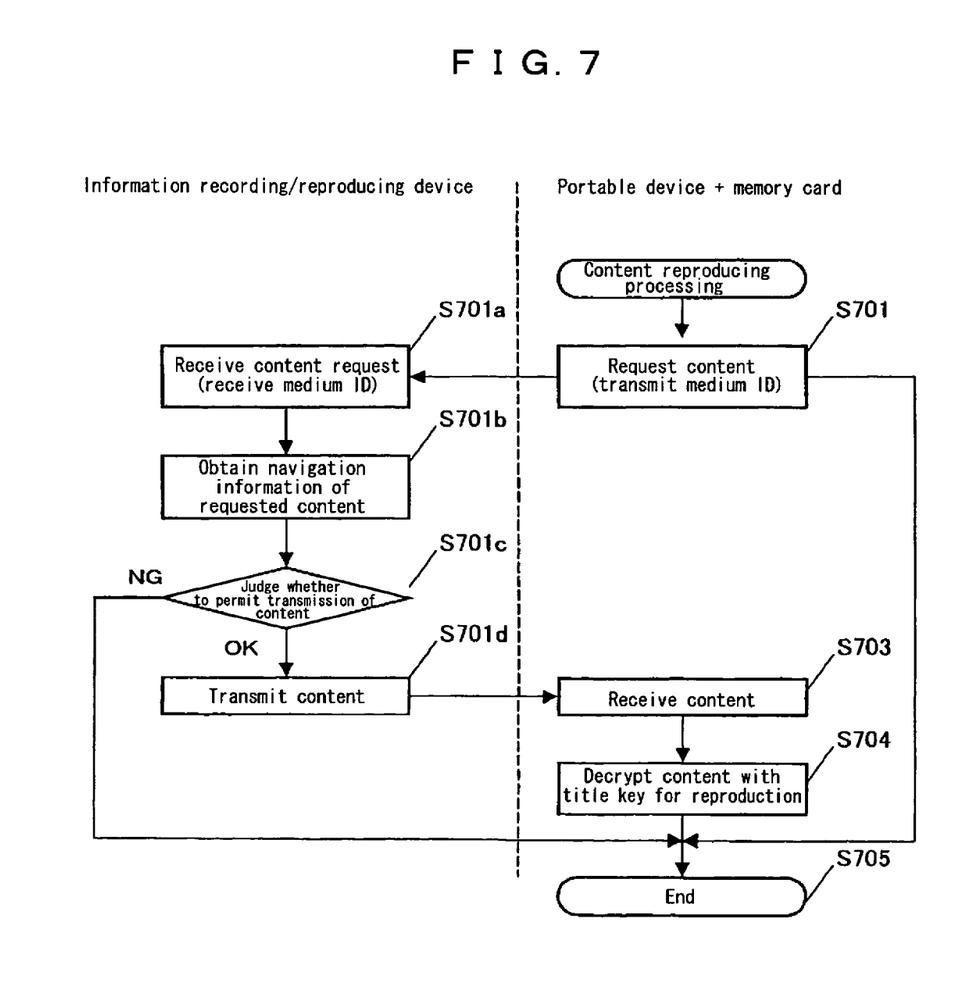
FIG. 7 An operational flowchart of the information recording/reproducing apparatus according to the embodiment of the present invention.

FIG. 7 is a flowchart of the operation program when there is a content request to the information recording/reproducing apparatus according to the embodiment of the present invention from the portable device to which the memory card is inserted.

Hereinafter, the embodiment of the present invention will be described referring to FIG. 1-FIG. 7.

First, the operation will be described in the case where the content is recorded to the information recording/reproducing apparatus.

When the user gives a recording instruction to the information recording/reproducing apparatus through the operation key, the operation part 110 detects the key operation and outputs the operation detail to the control part 107.

The control part 107 to which the recording instruction is inputted searches the content ID that is not used from the navigation information recorded in the navigation information storage part 111, and reserves the unused content ID.

Then, the control part 107 gives an instruction to the title key generating part 108 to generate the title key, and the title key generating part 108 outputs the generated title key.

The control part 107 inputs the title key obtained from the title key generating part 108 to the content encrypting part 103.

Then, the control part 107 connects the switch 104 to the switching terminal 105 and performs encoding processing to the content inputted from the external input part 101 through the encoding part 102. The content encrypting part 103 performs encryption processing to the encoded content with the title key.

The control part 107 records the encrypted content to the content storage part 109 in relationship to the content ID, and continues the recording processing until there is a recording stop instruction from the user.

When the user designates termination of the recording operation through the operation key, the operation part 110 detects the key operation and outputs the operation detail to the control part 107.

The control part 107 to which the termination instruction is inputted, gives an instruction for terminating the encryption processing to the content encrypting part 103 so as to stop obtaining the encrypted content. Then, the navigation information of the recorded content is generated anew. The content ID, the title key, the checkout target and the like are recorded in the navigation information to be registered to the navigation information storage part 111.

When the content is recorded, it is recorded that the checkout destination of the navigation information has not been a checked out yet.

Through the above-described operation, the content inputted to the information recording/reproducing apparatus can be recorded through encrypting.

Next, an operation will be described in the case where the content recorded in the information recording/reproducing apparatus is checked out to the memory card.

It is assumed here that the content and the navigation information as shown in FIG. 3 are recorded in the information recording/reproducing apparatus (IP address=#1) and the memory card (medium ID=0001).

Three pieces of contents are recorded in the information recording/reproducing apparatus, and the IDs of the respective contents are #1001, #1002 and #1003.

The content of the content ID=#1001 is encrypted with the title key 1 and not checked out to the memory card.

The content of the content ID=#1002 is encrypted with the title key 2 and checked out to the two memory cards of the medium ID=0001 and the medium ID=0005.

The content of the content ID=#1003 is encrypted with the title key 3 and checked out to the memory card of the medium ID=0005.

Normally, the number of checking out the secure content to the memory card is finite. However, the explanation will be continued herein without setting any specific limits.

In the meantime, the navigation information concerning a single content is recorded in the memory card. It is the content ID=#1002, and the encrypted title key A and the content are stored in the information recording/reproducing apparatus with the IP address=#1.

The checkout operation will be described in detail referring to the flowcharts of FIG. 5 and FIG. 6.

The information recording/reproducing apparatus indicates a menu on a display (S501). It is assumed that there are choices of reproduction, recording, checkout, deletion and the like in the menu.

When the user selects the checkout through the operation key, the operation part 110 detects the key operation and informs it to the control part 107.

When it is detected that the checkout is selected (S502), the control part 107 performs authentication processing between the inserted memory card 116 through the interface part 115 (S503, S503a).

The control part 107 obtains the medium ID of the memory card 116 during the authentication processing.

When the authentication processing is succeeded (S504), the control part 107 obtains all the navigation information from the navigation information storage part 111 (S505), and displays the contents registered in the navigation information on the display to request the user to select the content to be checked out (S506).

When the user selects the content to be checked out through the key operation, the operation part 110 detects the key operation and informs it to the control part 107.

When the control part 107 detects the selected content (S601), the control part 107 searches the navigation information obtained from the navigation information storage part 111, and extracts the selected content (S602). It will be described herein on an assumption that the user has selected the content ID=#1001.

Then, the control part 107 obtains the title key 1 contained in the navigation information of the extracted content, and outputs it to the title key encrypting part 114 along with the medium ID=0001 of the memory card 116 obtained earlier.

The title key encrypting part 114 generates the encrypted title key B by performing encryption processing to the title key 1 by using the inputted medium ID, and outputs it to the control part 107 (S603).

Then, the control part 107 adds the medium ID=0001 of the memory card, that is checked out to the items of the checkout destination, as a postscript to the navigation information of the content ID=#1001 so as to update the navigation information in the navigation information storage part 111 (S604).

Subsequently, the control part 107 shifts to the operation for updating the navigation information recorded in the memory card 116.

The control part 107 requests the navigation information recorded in the memory card 116 to the memory card 116 (S605).

The memory card 116 transmits the navigation information recorded inside therein to the information recording/reproducing apparatus (S605a). The navigation information recorded in the memory card is the content ID, the encrypted title key, and the IP address of the information recording/reproducing apparatus in which the content is recorded.

The control part 107 receives the navigation information from the memory card 116 (S606), and adds the navigation information to be checked out to the received navigation information and writes it to the memory card 116 through the interface part 115 (S607). The added information is the content ID=#1001, the encrypted title key B, and the IP address=#1 of the information recording/reproducing apparatus.

The memory card 116 records the received navigation information to the inside (S607a).

The control part 107 ends the checkout operation when the writing processing of the navigation information to the memory card 116 is completed (S608).

When the user selects the processing other than the checkout from the menu selection display (S501), it proceeds to the respective processing (S502a).

Further, when it is judged that the authentication processing cannot be completed properly (S504), the checkout operation is ended (S504a).

Furthermore, when the user does not select any contents in selecting the content to be checked out, the checkout operation is ended (S608).

Through the above-described operation, the contents recorded in the information recording/reproducing apparatus can be checked out to the memory card.

Next, referring to the flowchart of FIG. 7, the operation will be described in the case where the memory card 116 is taken out from the information recording/reproducing apparatus and inserted to the portable device for reproducing the content checked out earlier.

The portable device to which the memory card with the medium ID=0001 is inserted requests the content of the content ID=#1001 to the information recording/reproducing apparatus 8S701). At the same time, the medium ID of the inserted memory card is transmitted. These are received by the transmitting/receiving part 117 through the antenna 118.

When the request of the content and acquisition of the medium ID are inputted to the control part 107 through the transmitting/receiving part 117 (S701a), the control part 107 searches the requested content of the content ID=#1001 from the navigation information storage part 111 to obtain the detail of the checkout destination (S701b). As can be seen from FIG. 3, the checkout destination of the content ID=1001 is the medium ID=0001.

The control part 107 judges whether or not the checkout medium ID of the memory card accords with the medium ID received from the portable device (S701c). The media IDs are consistent herein, so that the encrypted content of the requested content ID=#1001 is obtained from the content storage part 109, and is transmitted to the portable device through the transmitting/receiving part 117 (S701d). Thereby, the operation of the information recording/reproducing apparatus is ended.

In the meantime, the portable device that has received the encrypted content from the information recording/reproducing apparatus (S703) obtains the title key 1 by performing decryption processing to the encrypted content key B recorded inside therein according to the own medium ID=0001, and additionally performs reproduction by decrypting and decoding the received encrypted content by using the title key 1 (S704, S705).

Further, the control part 107 judges whether or not the checkout medium ID of the memory card accords with the medium ID received from the portable device (S701c), but, if it is judged as inconsistent, the requested content is not transmitted and the portable device ends the reproducing operation (S705).

Through the above-described operation, it is possible to transmit the encrypted content to the portable device when there is a request for the content from the portable device.

In the information recording/reproducing apparatus constituted in this manner, when the content of a large capacity or unknown capacity to the memory card 116 is checked out, it is possible for the user to reproduce the contents recorded in the information recording/reproducing apparatus 201, with the portable device 202 to which the memory card 116 can be inserted, without minding the capacity of the contents recorded in the information recording/reproducing apparatus 201 through recording a method for accessing to the information recording/reproducing apparatus 201, in which the contents and the title key for decrypting the encrypted contents are recorded, to the memory card 116, and transmitting and receiving the encrypted contents of a large capacity through the network 203 such as the Internet. In addition, the memory card 116 with a large capacity is not necessary, since only a small amount of information is recorded in the memory card 116.

Transmission and reception from the information recording/reproducing apparatus 201 to the portable device 202 are carried out through the network 203 such as the Internet. The key for decrypting the encrypted contents distributed on the network 203 cannot be decrypted by a third party through recording it to the memory card 116, even when he or she unlawfully duplicates the encrypted contents on the network 203. Like this, it is possible to restrict the reproduction of the contents protected under the copyrights.

Further, the information recording/reproducing apparatus 201 carries the medium ID, i.e. the characteristic information of the memory card 116 checked out. Thus, it is possible to eliminate contents request from the portable device 202 to which the memory card other than the checkout card is inserted. Thereby, unnecessary transmission and reception of the encrypted contents on the network can be restricted.

The contents are checked out with the memory card 116 as an external medium in this embodiment. However, the external medium may be a recording medium having a medium ID.

Further, permission of the contents transmission to the portable device 202 is judged by using the medium ID in the embodiment. However, it may be judged by using the result of the authentication processing performed between the portable device 202 and the memory card 116.

Furthermore, although the contents are not specified in the embodiment, examples thereof may be music, videos, voices, still pictures, documents, etc.

Moreover, in the embodiment, the content encrypted with the title key is transmitted and received from the information recording/reproducing apparatus 201 to the portable device 202 via the network 203. However, further, it may be transmitted and received through performing encryption processing by using session keys generated in both the information recording/reproducing apparatus 201 and the portable device 202.

Further, the navigation information to be written to the memory card 116 at the time of checkout is referred to as the content ID, the encrypted title key and the IP address in the embodiment. However, additional information such as the creator of the content and the date of creation may be added.

Furthermore, the IP address is used in the embodiment as the method for accessing to the information recording/reproducing apparatus 201. However, it may be a characteristic number, characteristic letters, characteristic codes such as the telephone number, HTTP address, or the like for specifying the information recording/reproducing apparatus 201.

Moreover, although the recording area of the navigation information recorded to the memory card 116 is not specified in the embodiment, one of the items in the navigation information may be set as an inaccessible area unless the authentication processing is properly completed.

The information recording/reproducing program of the present invention is a program for making a computer execute the functions of all or a part of the means (or devices, elements, or the like) of the information recording/reproducing apparatus, which operates in cooperation with the computer. The computer is not limited to absolute hardware such as a CPU, but may be firmware, OS, or may further be those including peripheral devices. A part of the means (or devices, elements or the like) mentioned above denotes one or some of the plurality of means. The functions of the means mentioned above suggests all or a part of the functions of the above-described means.

Further, the recording medium of the present invention is a recording medium that can be read out by the computer to which the above-described information recording/reproducing program is recorded. Examples thereof may be a CD-ROM, a ROM and the like.

Furthermore, the transmission medium of the present invention is the one for transmitting the above-described information recording/reproducing program. Examples thereof may be the Internet, optics, radio waves, sound waves and the like.

INDUSTRIAL APPLICABILITY

The present invention is effective for the information recording/reproducing apparatus, the information recording/reproducing method, the information recording/reproducing program, and the recording or transmission medium for reproducing the secure contents on the network by the portable device to which a small-capacity external medium is mounted.

The invention claimed is:

1. An information recording/reproducing apparatus in which content has been recorded, the content being reproduced through an external content reproducing apparatus, the information recording/reproduction apparatus comprising:
   a title key generator for generating a title key of said content;
   a content encoder for encrypting said content according to said title key;
   a content storage for storing the encrypted content;
   a navigation information storage for storing said title key;
   a title key encoder for encrypting said title key;
   an interface for inserting an external medium and exchanging data with said external medium;
   a transmitting/receiving device for communicating with said external content reproducing apparatus;
   and a controller, wherein:
   said controller reads out a medium ID from said external medium through said interface, and stores in said navigation information storage said medium ID as a medium ID for encrypting,
   said controller reads out said title key and said medium ID from said navigation information storage and outputs said title key and said medium ID to said title key encoder,
   said title key encoder encrypts said title key according to said medium ID,
   said controller outputs said encrypted title key and a connecting method for connecting said external content reproducing apparatus to said transmitting/receiving device to said external medium through said interface, and
   said controller, when a request for content and a medium ID for decrypting are received from said external content reproducing apparatus, judges whether said medium ID for encrypting coincides with said medium ID for decrypting or not, and in case said medium ID for encrypting coincides with said medium ID for decrypting, reads out the encrypted content from said content storage, and transmits said encrypted content to said external content reproducing apparatus through said transmitting/receiving device.

2. A content reproducing method to reproduce content through an external content reproducing apparatus using an information recording/reproducing apparatus in which said content has been recorded, the content reproducing method comprising:
   a step for generating, via said information recording/reproducing apparatus, a title key of said content;
   a step for encrypting, via said information recording/reproducing apparatus, said content according to said title key;
   a step for storing, via said information recording/reproducing apparatus, the encrypted content;
   a step for storing, via said information recording/reproducing apparatus, said title key;
   a step for reading out, via said information recording/reproducing apparatus, a medium ID from an external medium which has been inserted into said information recording/reproducing apparatus, and storing said medium ID as a medium ID for encrypting;
   a step for encrypting, via said information recording/reproducing apparatus, said title key according to said medium ID for encrypting;
   a step for outputting, via said information recording/reproducing apparatus, said encrypted title key and a connecting method for connecting said external content reproducing apparatus to said information recording/reproducing apparatus to said external medium;
   a step for receiving, via said information recording/reproducing apparatus, a request for content and a medium ID for decrypting from said external content reproducing apparatus;
   a step for judging, via said information recording/reproducing apparatus, whether said medium ID for decrypting coincides with said medium ID for encrypting or not;
   a step for transmitting, via said information recording/reproducing apparatus, said encrypted content to said external content reproducing apparatus in case said medium ID for decrypting coincides with said medium ID for encrypting.

3. The content reproducing method according to claim 2, further comprising steps of:
   a step for reading out said connecting method, said encrypted title key, and said medium ID as said medium ID for decrypting from said external medium with said external content reproducing apparatus, wherein said external medium has been taken out from said information recording/reproducing apparatus and then inserted to said external content reproducing apparatus;
   a step for transmitting, via the external content reproducing apparatus, said request for content and said medium ID for decrypting to said information recording/reproducing apparatus according to said connecting method;

a step for receiving, via the external content reproducing apparatus, said encrypted content from said information recording/reproducing apparatus;

a step for decrypting, via the external content reproducing apparatus, said encrypted title key using said medium ID for decrypting; and a step for decrypting, via the external content reproducing apparatus, and reproducing said received encrypted content using said decrypted title key.

* * * * *